United States Patent [19]

Ringler

[11] 4,041,557
[45] Aug. 16, 1977

[54] TOILET FLUSHING DEVICE WITH OVERFLOW INHIBITOR

[75] Inventor: Robin L. Ringler, San Francisco, Calif.

[73] Assignee: Aluminum Plumbing Fixture Corporation, Burlingame, Calif.

[21] Appl. No.: 727,777

[22] Filed: Sept. 29, 1976

[51] Int. Cl.² .................... E03D 11/02; E03D 11/18
[52] U.S. Cl. ........................................... 4/75; 4/100; 4/DIG. 3; 4/DIG. 15
[58] Field of Search ...... 4/75, 100, DIG. 3, DIG. 15, 4/67 R, 249, 1

[56] References Cited

U.S. PATENT DOCUMENTS

| 2,988,751 | 6/1961 | Rutherford | 4/75 X |
| 3,908,204 | 9/1975 | Hopkins | 4/100 |
| 3,987,502 | 10/1976 | Hartmann | 4/75 |

Primary Examiner—Henry K. Artis
Attorney, Agent, or Firm—Robert G. Slick

[57] ABSTRACT

An electrical toilet flushing device is provided which is particularly adapted for use in prisons and similar institutions whereby a toilet cannot be made to overflow by repeated flushing, even if the toilet is clogged. A fail-safe electrical circuit is provided and, in accordance with one embodiment of the invention, an electrical alarm is provided for toilets, warning when the water reaches a high level.

3 Claims, 3 Drawing Figures

TOILET FLUSHING DEVICE WITH OVERFLOW INHIBITOR

SUMMARY OF THE INVENTION

In penal institutions and similar institutions, inmates sometimes will attempt to disrupt normal operations by stuffing clothes or other objects in the bowl of a toilet and repeatedly flushing the toilet to cause a flooding condition. This can result in substantial property damage, particularly, as is often the case, if the cells are located on an upper floor of a building containing offices, archives or other installations below.

Although various devices have been proposed in the past to prevent such accidental or deliberate flooding of toilets, none has proved fully satisfactory.

In accordance with the present invention, an electrical flushing device is provided for a toilet wherein the toilet cannot be repeatedly flushed and cannot be flushed at all if the water level is dangerously high in the bowl.

Another object of the present invention is to provide a device wherein all controls including the electrodes which actuate the toilet protective device are located in such a manner that they cannot be reached or defeated by an inmate.

Still a further object of the invention is to provide an electrical flushing device which is fail-safe in that the protective feature is not dependent upon the electrical supply so that if the electrical supply fails, the toilet cannot be flushed.

Still another object of the present invention is to provide an alarm system for a toilet so that in case the level of water in a toilet bowl reaches a high level, an alarm will be sounded and also means can be provided to rapidly determine which toilet is causing the difficulty.

Various other objects and features of the invention will be brought out in the balance of the specification.

DESCRIPTION OF THE PREFERRED EMBODIMENTS

Figure 1:
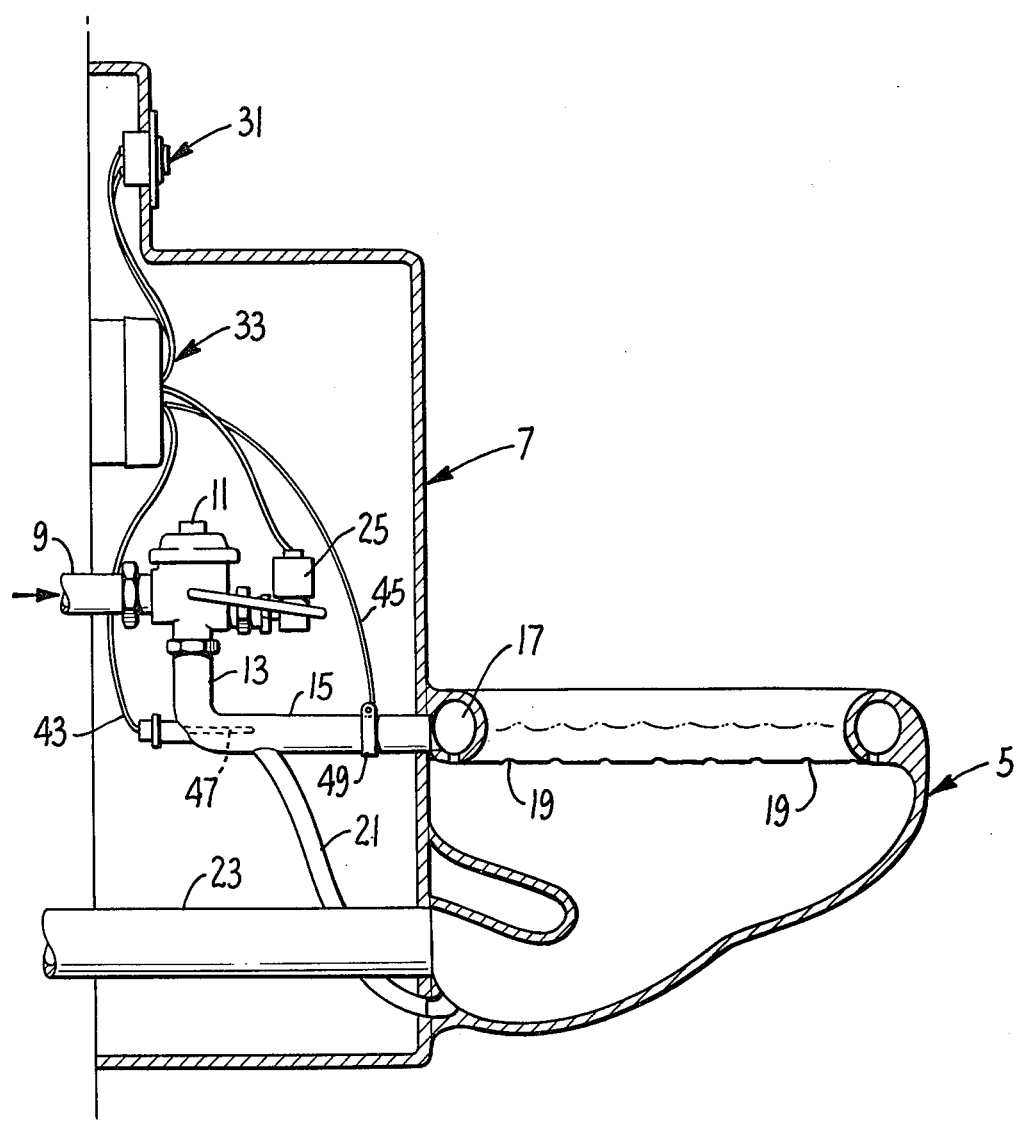
FIG. 1 is a side view, partly in section of a toilet embodying the present invention.
Figure 2:
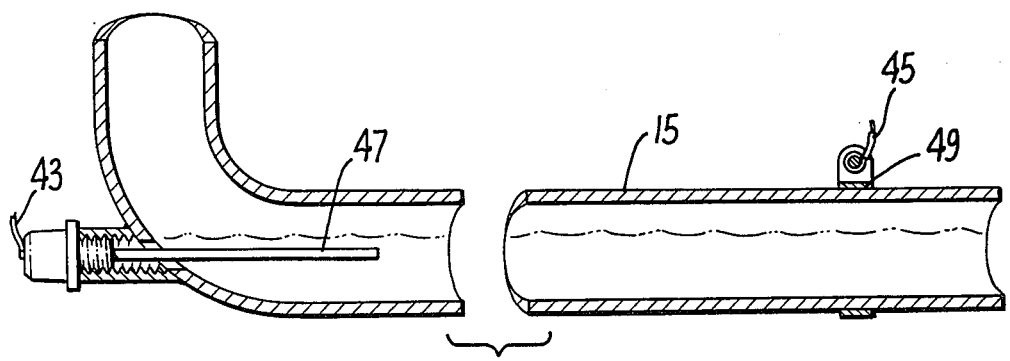
FIG. 2 is an enlarged sectional view showing the location of the sensing electrode.
Figure 3:
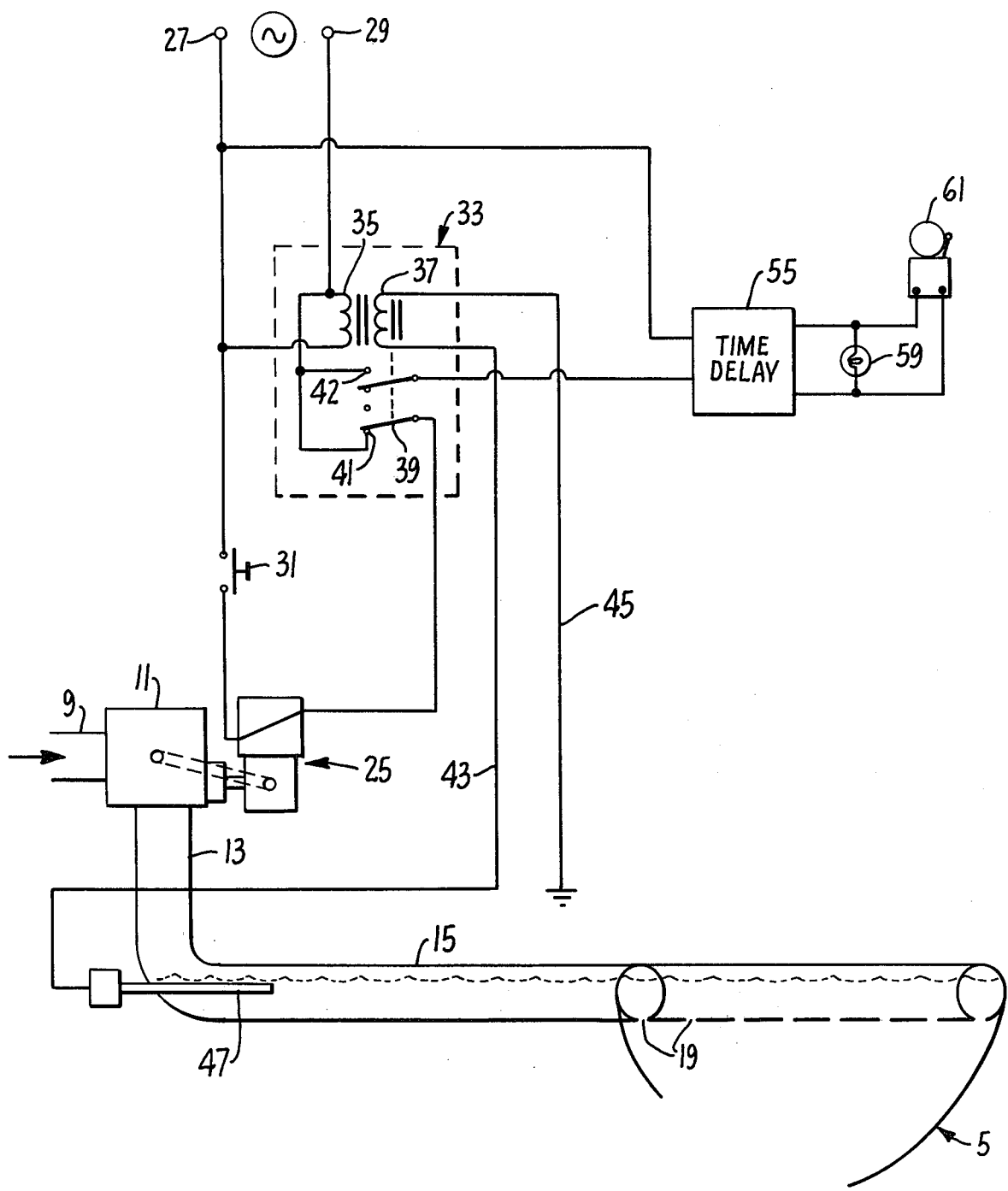
FIG. 3 is a wiring diagram of the toilet flushing device.

Referring now to the drawings by reference characters, the electrical flushing toilet of the present invention includes the usual bowl generally designated 5 mounted on a cabinet 7. The toilet is provided with a water supply 9 which leads to a flushing valve 11 and the outlet 13 of the valve goes to the main flushing line 15 which discharges the main body of water into the rim 17 of the bowl where it enters through holes 19. A portion of the water passes through blow-out line 21 to initiate the syphon action. Waste leaves the bowl through line 23. The structure thus far described is conventional and flush valve 11 would normally be actuated by a mechanical handle, not illustrated, mounted thereon.

In accordance with the present invention, an electrical actuator 25 for valve 11 is provided and current is supplied to the actuator through the power supply lines 27 and 29 through push-button switch 31. The power supply lines also go to the primary 35 of the induction relay generally designated 33. The induction relay is well known to those skilled in the art and consists of a transformer having a primary 35 and a secondary 37 with an armature 39 which is actuated only when current flows in secondary 37. In other words, if the leads to the secondary are open, the armature is not drawn in. Contacts 41 of the relay are normally closed while contacts 42 are normally open. Contacts 41 are in series with line 29 leading to actuator 25. One side of the secondary 37 is connected by means of wire 43 to the insulated electrode 47 located far back in line 15. The other side is grounded through line 45; it could be connected to the outside of pipe 15 by ground clamp 49.

The operation is as follows: Since the contacts 41 are normally closed, pushing the button 31 will actuate flush valve 11 through actuator 25. Now as water flows into the pipe 15, the circuit is closed between the electrode 47 and ground so that current flows in the secondary 37 which attracts armature 39, opening contacts 41. So long as water remains in the pipe 15, it is impossible to again flush the toilet since the contacts 41 will remain open. Thus, even if inmates should stuff clothing or the like in the toilet bowl and attempt to flood a cell by repeatedly flushing the toilet, no further flushing action can be achieved as long as the pipe 15 is filled with water. When line 15 drains at the completion of a flushing action, the circuit in secondary 37 is broken, closing contacts 41 and again rendering the flushing device operative.

In a practical embodiment of the invention, the induction relay was a B/W type R (made by B/W Controls, Inc.) enclosed in an NEMA 1 enclosure. The primary coil was 115 volts while the secondary coil was 360 volts for use in potable water systems. Since the secondary 37 operates at such a high voltage, it is obvious that only a slight conductivity of the water in pipe 15 is required to close the circuit.

In many instances, it is desired that authorities be alerted if there is any attempt to create a flooded condition. The induction relay 33 is fitted with a normally open contact 42 connected through a time delay relay 55 in series with the AC line and can be used to actuate either a light 59 or an audible warning device 61, or both. The light 59 might be located in the warden's office so that officials will be instantly aware of the exact cell location of attempted flooding. Obviously the time-delay relay 55 should have a time delay which is longer than the time which is normally required for the line 15 to drain during a normal flushing cycle.

It will be noted that all of the electrical equipment is located within the cabinet 7. Thus, it is impossible for an inmate to get to the wiring of the flushing mechanism. Further, it will be noted that the electrode 47 is located in the supply pipe 15 back from the rim of the toilet bowl so that it is impossible for an inmate to disconnect the electrode or to defeat the action in any way. Line 15 is below the top of bowl 5 so that the warning would be made before the bowl overflowed.

Many variations can be made in the exact structure shown. For instance, the induction relay 33 could be replaced with an ordinary step-up transformer with a solenoid wired in the secondary to actuate the armature of a relay or with a solid state device. Two insulated electrodes could be employed rather than the single electrode operated against ground which is, of course, necessary in the case of plastic piping.

I claim:

1. A toilet having an electrical flushing mechanism including an overflow inhibiting circuit, comprising in combination:
   a. a toilet bowl having a water supply pipe leading thereto;
   b. an electrically-actuated flushing valve for supplying flushing water through said supply pipe from a source of water supply;
   c. an electric supply including a momentary contact switch for actuating said flushing valve;
   d. an insulated electrode mounted in said water supply pipe;
   e. said electrode leading to a detection circuit and means whereby said detection circuit deactivates said electric supply when water is in said supply pipe and completes the circuit between said electrode and ground.

2. The structure of claim 1 wherein said deactivating means includes an induction relay having a primary and secondary coil wherein said primary coil is connected to said electric supply and wherein said secondary is in series with said electrode, said induction relay having normally closed contacts which are opened upon current flowing in said secondary, the contacts of said relay being in series with said electric supply.

3. The structure of claim 1 having in addition a time-delay relay having a time delay greater than the normal flushing time of a toilet, said time-delay relay having means thereon to activate an indicator device.

* * * * *